US009644709B2

(12) United States Patent
Venturi

(10) Patent No.: US 9,644,709 B2
(45) Date of Patent: May 9, 2017

(54) SPEED TRANSMISSION DEVICE FOR A HYBRID TYPE MOTOR VEHICLE

(75) Inventor: Stéphane Venturi, Roiffieux (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 0 days.

(21) Appl. No.: 13/172,119

(22) Filed: Jun. 29, 2011

(65) Prior Publication Data
US 2012/0031229 A1 Feb. 9, 2012

(30) Foreign Application Priority Data

Jul. 8, 2010 (FR) ..................... 10 02876

(51) Int. Cl.
F16H 37/06 (2006.01)
F16H 3/10 (2006.01)
B60K 6/383 (2007.10)
B60K 6/387 (2007.10)
B60K 6/48 (2007.10)
B60K 6/547 (2007.10)
B60W 10/02 (2006.01)
B60W 10/06 (2006.01)
B60W 10/08 (2006.01)
(Continued)

(52) U.S. Cl.
CPC .............. F16H 3/10 (2013.01); B60K 6/383 (2013.01); B60K 6/387 (2013.01); B60K 6/48 (2013.01); B60K 6/547 (2013.01); B60W 10/02 (2013.01); B60W 10/06 (2013.01); B60W 10/08 (2013.01); B60W 20/00 (2013.01); F16H 61/0295 (2013.01); B60K 2006/4808 (2013.01); B60Y 2200/124 (2013.01); Y02T 10/626 (2013.01); Y02T 10/6221 (2013.01); Y02T 10/6286 (2013.01); Y10T 74/19051 (2015.01)

(58) Field of Classification Search
CPC .......... B60K 6/383; B60K 6/48; B60K 6/387; B60K 6/547; B60W 10/02; B60W 10/06; B60W 20/00; F16H 61/0295; F16H 3/10
USPC .......... 74/661, 329, 330, 340, 665; 903/902, 903/909, 911, 912, 913, 915, 916; 180/65.21
See application file for complete search history.

(56) References Cited

U.S. PATENT DOCUMENTS 6,634,247 B2 * 10/2003 Pels et al. ................ 74/329
7,093,517 B2 * 8/2006 Hanyu et al. ............. 74/661
(Continued)

FOREIGN PATENT DOCUMENTS

DE  42 12 324 A1  8/1992
EP  0 445 873 A1  9/1991
(Continued)

Primary Examiner — William Kelleher
Assistant Examiner — Zakaria Elahmadi
(74) Attorney, Agent, or Firm — Fitch, Even, Tabin & Flannery LLP

(57) ABSTRACT

The present invention relates to a speed transmission device for a hybrid type motor vehicle comprising a primary transmission shaft (34) connected to a thermal engine (10) through a disengaging coupling (38) and carrying at least two primary toothed wheels (50, 52) cooperating with at least two secondary toothed wheels (54, 56) carried by a secondary transmission shaft (36) connected to an axle shaft (20) of the vehicle and to an electric machine (12).
According to the invention, one (54) of the secondary toothed wheels is carried by secondary shaft (36) through a one-way coupling (58).

16 Claims, 2 Drawing Sheets

(51) Int. Cl.
*B60W 20/00* (2016.01)
*F16H 61/02* (2006.01)

(56) References Cited

U.S. PATENT DOCUMENTS

| | | | |
|---|---|---|---|
| 7,121,164 B2* | 10/2006 | Hanyu et al. | 74/661 |
| 7,249,537 B2* | 7/2007 | Lee et al. | 74/661 |
| 7,276,008 B2* | 10/2007 | Yasui et al. | 475/5 |
| 7,753,816 B2* | 7/2010 | Chachra et al. | 475/5 |
| 2004/0159183 A1* | 8/2004 | Sakamoto et al. | 74/661 |
| 2005/0101432 A1* | 5/2005 | Pels et al. | 477/5 |
| 2007/0028718 A1* | 2/2007 | Lee et al. | 74/661 |
| 2011/0179905 A1* | 7/2011 | Tanba et al. | 74/661 |
| 2012/0053011 A1* | 3/2012 | Onomura et al. | 477/3 |
| 2012/0198963 A1* | 8/2012 | Griesmeier et al. | 74/661 |
| 2012/0255396 A1* | 10/2012 | Murata | 74/661 |

FOREIGN PATENT DOCUMENTS

| | | |
|---|---|---|
| EP | 2 014 499 A1 | 1/2009 |
| FR | 2 811 395 A1 | 1/2002 |
| WO | WO 03/100298 A1 | 12/2003 |
| WO | WO 2005/007504 A1 | 1/2005 |

* cited by examiner

SPEED TRANSMISSION DEVICE FOR A HYBRID TYPE MOTOR VEHICLE

FIELD OF THE INVENTION

The present invention relates to a speed transmission device for driving a hybrid type motor vehicle.

As it is well known, this type of vehicle combines, as a propulsion or traction means, a thermal engine, generally an internal-combustion engine, and a rotary electric machine connected to an electric source, such as one or more electric accumulators.

This combination allows the performances of this vehicle to be optimized, notably by reducing the fuel consumption of the entire device, while preserving the environment through limited pollutant discharge to the atmosphere.

BACKGROUND OF THE INVENTION

In the example described in document FR-2,811,395, this type of vehicle comprises a speed transmission device with a motive primary line arranged substantially parallel to a driven secondary line that controls the drive wheels of this vehicle. The primary line consists, on the one hand, of a main drive shaft driven in rotation by the thermal engine through a disengaging coupling and, on the other hand, of a tubular auxiliary drive shaft driven in rotation by the electric motor and surrounding the main drive shaft. The main drive shaft and the auxiliary drive shaft can be rotatingly secured to one another by a jaw clutch. Each shaft fixedly carries two toothed wheels interlocked each with driven toothed wheels carried by the driven secondary line while being mounted idle on this line. This line also carries alternate-clearance sliding gears allowing to rotatingly secure the driven toothed wheels to this secondary line.

Thus, during operation, the vehicle is driven into motion at different speeds, either by the electric motor or by the thermal engine, or by both. This is achieved by acting upon the various couplings (disengaging coupling and/or jaw clutch and/or sliding gears) carried by the different lines in order to secure the main drive shaft to the thermal engine and/or this main drive shaft to the auxiliary drive shaft and/or one of the driven toothed wheels to the driven secondary line.

Although satisfactory, this transmission device however involves some significant drawbacks.

In fact, when only the electric motor is used to drive the vehicle, it is necessary to couple the driven wheel to the secondary line so as to transmit the rotating motion of this electric motor to this secondary line. This involves device complexity in order to fulfill a basic function.

Furthermore, the vehicle must comprise a multiplicity of actuators for controlling the disengaging coupling, the jaw clutch and the sliding gears. These actuators increase the device production cost and they can be the source of failures and/or malfunction.

Besides, these actuators must be controlled by a processing unit such as the calculator the engine is usually provided with, which requires increasing the capacity of this calculator.

Finally, it is necessary, in order to obtain the desired speed, to couple or to uncouple some elements of the device, such as the driven toothed wheels. This has the effect of extending the time required for shifting gears while involving driving discomfort.

The present invention aims to overcome the aforementioned drawbacks by means of a simple and inexpensive speed transmission device.

Furthermore, such a device allows to use independently either engine while enabling energy recovery upon deceleration of the vehicle.

SUMMARY OF THE INVENTION

The invention therefore relates to a speed transmission device for a hybrid type motor vehicle comprising a primary transmission shaft connected to a thermal engine through a disengaging coupling and carrying at least two primary toothed wheels cooperating with at least two secondary toothed wheels carried by a secondary transmission shaft connected to an axle shaft of the vehicle and to an electric machine, characterized in that one of the secondary toothed wheels is carried by the secondary shaft through a one-way coupling.

The other secondary toothed wheel can be mounted idle in rotation on the secondary shaft and it is connected to said shaft through a disengaging coupling.

The primary toothed wheels and the secondary toothed wheels can form two gear trains with different gear ratios.

Advantageously, the one-way coupling can comprise a free wheel.

Preferably, the disengaging coupling can be a centrifugal clutch.

The electric machine can be connected to the axle shaft by a motion transmission multiplier track.

The device can comprise an intercalated shaft arranged between the primary shaft and the secondary shaft, and carrying intercalated toothed wheels cooperating with the wheels of said primary and secondary shafts.

One of the intercalated toothed wheels can cooperate with one of the toothed wheels of the primary shaft and it can be carried by the intercalated shaft through a one-way coupling.

Another one of the intercalated toothed wheels can cooperate with another toothed wheel of the primary shaft and it can be freely carried on the intercalated shaft while being connected to said shaft through a disengaging coupling.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
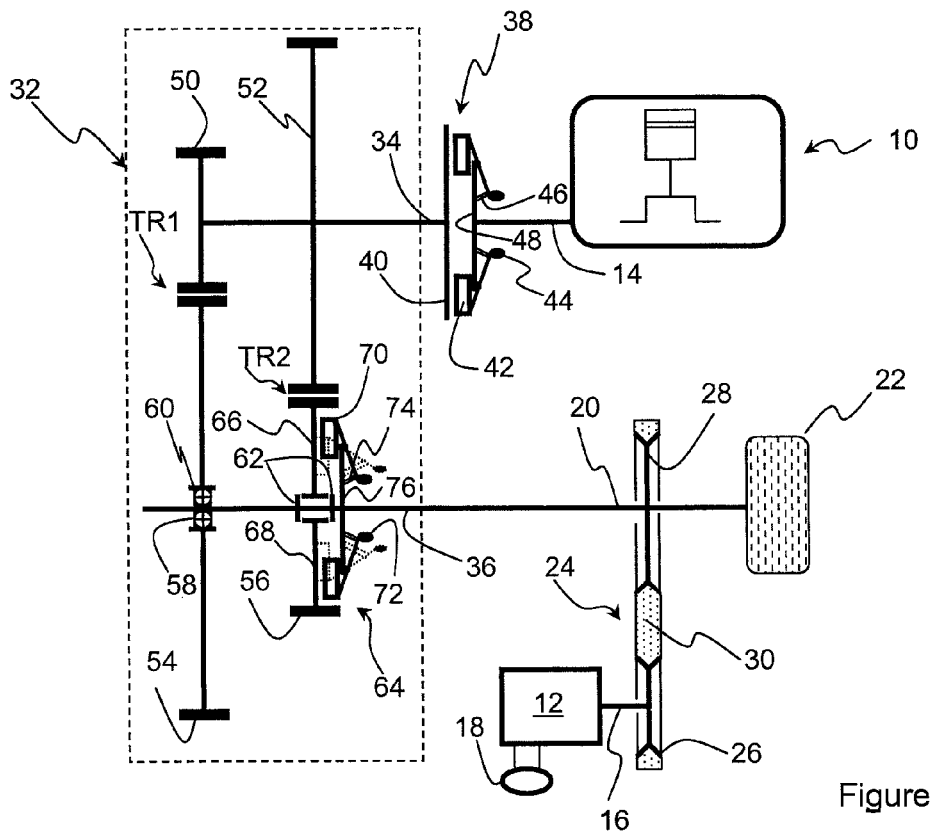
FIG. 1 is a diagram showing the speed transmission device for driving a hybrid type motor vehicle into motion according to the invention.

As illustrated in FIG. 1, the system for driving a hybrid vehicle into motion comprises a thermal engine 10, notably an internal-combustion engine, and an electric machine 12 that can work in electric motor mode or in power generator mode. Thermal engine 10 comprises an engine drive shaft 14 coming from an extension of the crankshaft, which is controlled in rotation by this engine. The electric machine also comprises a drive shaft 16, the rotor of this machine here, and it is connected to electric accumulators 18 (or batteries).

This system also comprises an axle shaft 20 that drives wheels 22 of the vehicle, directly or by means of a differential bridge.

This axle shaft is connected by a motion transmission multiplier track 24 to rotor 16 of the electric machine. By way of example, this track comprises a pulley 26 mounted on the rotor, another pulley 28 of different diameter mounted on the axle shaft and a belt 30 connecting kinematically the two pulleys.

Of course, this transmission track can comprise any other element providing rotating motion transmission between the rotor and the axle shaft, such as toothed wheels for example.

Finally, this system comprises a speed transmission device 32, referred to as gear box in the description hereafter, which is arranged between shaft 14 of the internal-combustion engine and axle shaft 20.

This gear box comprises a primary shaft 34 forming an extension of engine shaft 14 and a secondary shaft 36 arranged substantially parallel to the primary shaft and rotatingly secured to axle shaft 20.

Primary shaft 34 is connected to engine shaft 14 through a disengaging coupling 38. By way of example, this coupling is a centrifugal clutch whose reaction plate 40 is fixedly carried by one end of the primary shaft and whose friction plate 42, controlled in axial displacement by clutch shoes 44 and return springs 46, is carried by a plate 48 fixedly connected to the free end of engine shaft 14. Thus, under the impulse of the rotation of this engine shaft 14, the friction plate is moved in axial translation under the effect of the centrifugal motion of the shoes and connected to reaction plate 40 through contact therewith.

This primary shaft fixedly carries in translation and in rotation at least two toothed wheels of different diameters, here a toothed wheel of small diameter 50 (or small toothed wheel) arranged in the vicinity of the free end of the primary shaft, and a toothed wheel 52 (or large toothed wheel) of larger diameter than wheel 50, arranged beside the reaction plate. For simplification reasons, in the rest of the description, these toothed wheels are referred to as primary toothed wheels.

These primary toothed wheels mesh with toothed wheels of different diameters carried by secondary shaft 36 secured to axle shaft 20. Thus, a large-diameter toothed wheel 54 cooperates with small toothed wheel 50 and a small-diameter toothed wheel 56 meshes with primary large toothed wheel 52. Similarly, for simplification reasons, these toothed wheels are referred to as secondary toothed wheels.

Thus, two gear trains are formed, a first one TR1 with toothed wheels 50, 54, and a second one TR2 with toothed wheels 52, 56, each one of these trains having different gear ratios R1, R2.

Secondary large-diameter toothed wheel 54 is arranged on secondary shaft 36 by interposing thereon a one-way coupling, such as a free wheel 58, between bearing 60 of this toothed wheel and this shaft.

Secondary small-diameter toothed wheel 56 is mounted idle on shaft 36 and immobilized in axial translation by fixed stops 62. This toothed wheel can be rotatingly secured to this shaft by means of a disengaging coupling 64.

By way of example, this coupling is a centrifugal clutch similar to the one arranged between engine shaft 14 and primary shaft 34 of gear box 32. More precisely, this coupling comprises a linking surface 66 made up of part of the shell 68 of toothed wheel 56 and a friction plate 70 opposite this linking surface. This friction plate is controlled in axial displacement by a set of clutch shoes 72 and of springs 74 carried by a plate 76 fixedly connected to secondary shaft 36. Thus, during rotation of shaft 36 and under the effect of the centrifugal motion of the shoes, the friction plate is shifted in axial translation in the direction of shell 68 until it comes into contact with surface 66. This therefore allows to establish a rotational link between shaft 36 and toothed wheel 56.

The various operating configurations are now going to be described.

The first stage is the electric mode of traction (or propulsion) of the hybrid vehicle wherein only electric machine 12 is used as the engine driving the vehicle.

In this mode, and with reference to FIG. 1, couplings 38 and 64 are in disengaged position and electric motor 12 is fed by batteries 18, thus generating rotation of rotor 16.

This rotor transmits its rotating motion to axle shaft 20 and consequently to secondary shaft 36, through motion transmission track 24 that amplifies it.

The rotation of the axle shaft is transmitted, directly or indirectly, to wheels 22 of the vehicle so as to drive this vehicle into motion.

Simultaneously, the rotation of secondary shaft 36 drives into rotation centrifugal clutch 64 that remains in disengaged position, until a threshold rotating speed Nr of this shaft is reached. Thus, secondary small-diameter toothed wheel 56 remains idle on this shaft without driving large primary toothed wheel 52.

This applies when the electric motor is actuated with a first direction of rotation of rotor 16 for driving the vehicle in forward gear. In this configuration, large-diameter toothed wheel 54 is not driven into rotation by free wheel 58, which is in this case in the sliding direction. Thus, all the primary and secondary toothed wheels 50, 52, 54 and 56 of gear box 32 are stopped.

For the reverse gear, rotor 16 of the electric motor is controlled in rotation in an opposite direction with a rotating speed that is lower than threshold value Nr, and couplings 38 and 64 remain in disengaged position.

Thus, secondary large-diameter toothed wheel 54 is driven into rotation by free wheel 58 that transmits the rotating motion of secondary shaft 36 thereto. This rotating motion is transmitted to primary shaft 34 through meshing of toothed wheel 54 with primary small toothed wheel 50. The rotation of shaft 34 drives into rotation large toothed wheel 52 that meshes with secondary toothed wheel 56 mounted idle on shaft 36, without driving this shaft 36 into rotation.

Furthermore, considering the disengaged position of centrifugal clutch 38, the rotation of primary shaft 34 is not retransmitted to shaft 14 driving the internal-combustion engine.

As regards the configuration wherein the vehicle is driven in forward gear with rotor 16 rotating in the first direction of rotation, as soon as the rotating speed of the axle shaft, or of the secondary shaft it is connected to, exceeds threshold value Nr, centrifugal clutch 64 is operative by connecting in rotation secondary shaft 36 to secondary small-diameter toothed wheel 56, as illustrated in dotted line in the figure.

In this configuration, toothed wheel 56 of secondary shaft 36 meshes with primary large toothed wheel 52 that drives primary shaft 34 into rotation. This rotation is then transmitted to wheel 50 that meshes with large toothed wheel 54. Considering the rotating speed differential between secondary shaft 36 and toothed wheel 54 due to the different ratios R1 and R2 between gear trains TR1 and TR2, and to the presence of free wheel 58, shaft 36 is not driven into rotation by wheel 54. This is due to the fact that the rotating speed of secondary shaft 36 is higher than the rotating speed of large toothed wheel 54.

It is thus possible to drive the vehicle into motion, either in forward gear over the entire range of use of the electric motor, or in reverse gear over a range of use of this motor from a rotating speed above 0 to a rotating speed of secondary shaft 36 below threshold value Nr.

Furthermore, during vehicle deceleration and/or braking phases, recovery of the electric energy is maximized. Electric machine 12 is used as a current generator for recharging batteries 18.

In the thermal mode of traction (or propulsion) of the hybrid vehicle that is described now, internal-combustion engine 10 is used as the engine driving the vehicle.

Figure 2:
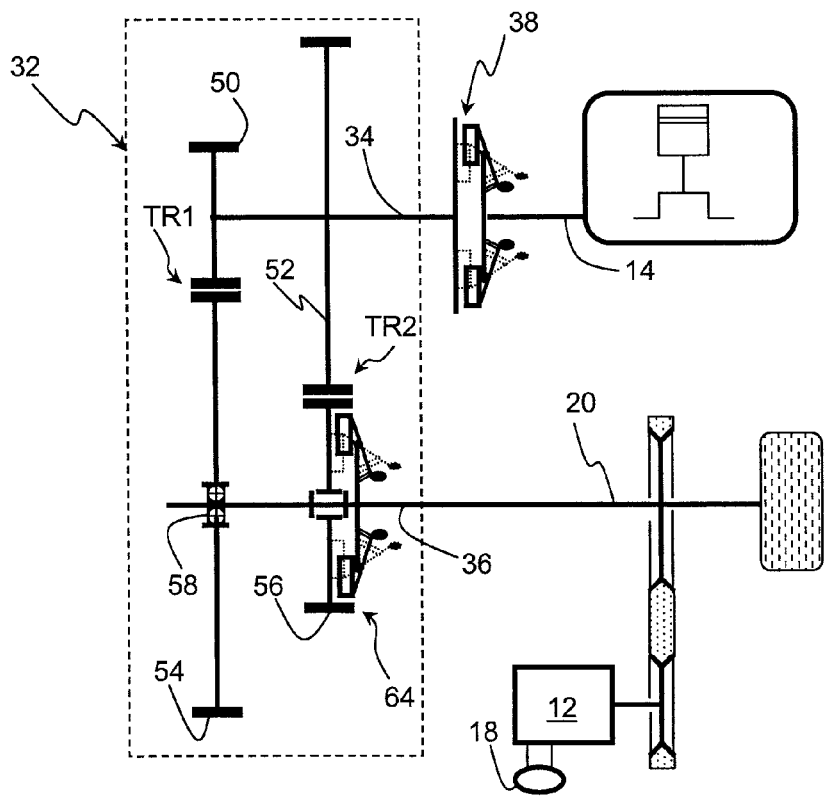
FIG. 2 shows this device with another operation configuration.

As illustrated in FIG. 2, in the rest state, none of the two centrifugal clutches 38 and 64 is operative.

As soon as rotating speed Nv of engine shaft 14 reaches a threshold value, centrifugal clutch 38 is operative by connecting kinematically shaft 14 to primary shaft 34 of gear box 32, as illustrated in the figure in doffed line.

Primary toothed wheels 50 and 52 are driven into rotation at the same speed as shaft 14.

Primary small toothed wheel 50 thus meshes with secondary large-diameter toothed wheel 54, which in turn drives into rotation, through free wheel 58, secondary shaft 36 and axle shaft 20.

Primary large toothed wheel 52 cooperates in mesh with secondary small-diameter toothed wheel 56.

If the speed of secondary shaft 36, driven into rotation by gear train TR1, is lower than aforementioned speed Nr, centrifugal clutch 64 remains in disengaged position. Thus, small-diameter toothed wheel 56 remains idle on shaft 36 and the rotation through meshing with large toothed wheel 52 has no effect on this shaft.

A first gear ratio is thus obtained between the thermal engine and the axle shaft through gear train TR1.

As soon as the rotating speed of shaft 36 exceeds threshold value Nr, centrifugal clutch 64 is active, as illustrated in doffed line in the figure, by connecting small-diameter toothed wheel 56 to this shaft. Secondary shaft 36 and axle shaft 20 are therefore driven at a rotating speed by gear train TR2.

In this position, gear train TR1 has no action on shaft 36 because, considering the rotating speed differential between large-diameter toothed wheel 54 and second shaft 36 driven by small-diameter toothed wheel 56, and the presence of free wheel 58, shaft 36 is not driven into rotation by wheel 54. The reason is that the rotating speed of the secondary shaft is higher than the speed of large toothed wheel 54.

In this other configuration, the vehicle is thus driven into motion according to a second gear ratio provided by gear train TR2.

It can be noted that, in both configurations, it is always possible to recharge batteries 18 of the vehicle using electric machine 12 as the generator.

Similarly, this electric machine can be used to recover energy, totally or partly, either during vehicle deceleration phases or during a braking phase, using this machine as a generator for the batteries.

It can be noted that, in cases where the vehicle is driven by thermal engine 10 and during the deceleration phase of this vehicle, the energy is totally recoverable, only through first train TR1, since free wheel 58 allows thermal engine 10 to be uncoupled from secondary shaft 36 and axle shaft 20.

When second train TR2 is used, the thermal engine is constantly coupled to the axle and part of the energy can be recovered in the vehicle deceleration phase since another part of the energy is used for "engine braking" of the thermal engine.

It can also be noted that, in the traction thermal mode, it is possible to combine the use of this thermal engine with that of the electric motor, both powers accumulating so as to drive the vehicle.

Figure 3:
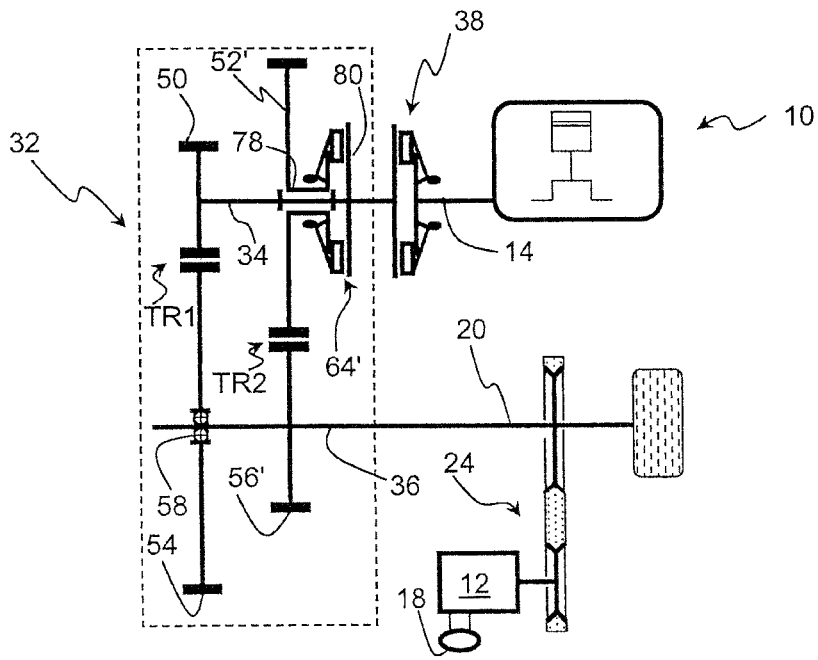
FIG. 3 is a diagram illustrating a variant of the speed transmission device of FIG. 1.

The variant of FIG. 3 differs from FIG. 1 in that primary large toothed wheel 52' is mounted idle in rotation by a hub 78 on primary shaft 34, but fixed in axial translation, in that the centrifugal clutch (64' here), initially arranged on shaft 36, is now arranged on the hub of this large toothed wheel in order to secure it, from a rotating speed of large toothed wheel 52 higher than the aforementioned rotating speed Nr, to shaft 36 through a plate 80 carried by the primary shaft, and in that secondary small-diameter toothed wheel 56' is mounted fixed on secondary shaft 36.

This variant allows to obtain the same speed configurations as the variant described in connection with FIGS. 1 and 2.

Thus, a first gear ratio is obtained through toothed wheels 50, 54 for a rotating speed of engine shaft 14 and of primary shaft 36 higher than speed Nv, and a second gear ratio is obtained through wheels 52' and 56' when the rotating speed of toothed wheel 52' reaches a rotating speed Nr' allowing centrifugal clutch 64' to be actuated.

Figure 4:
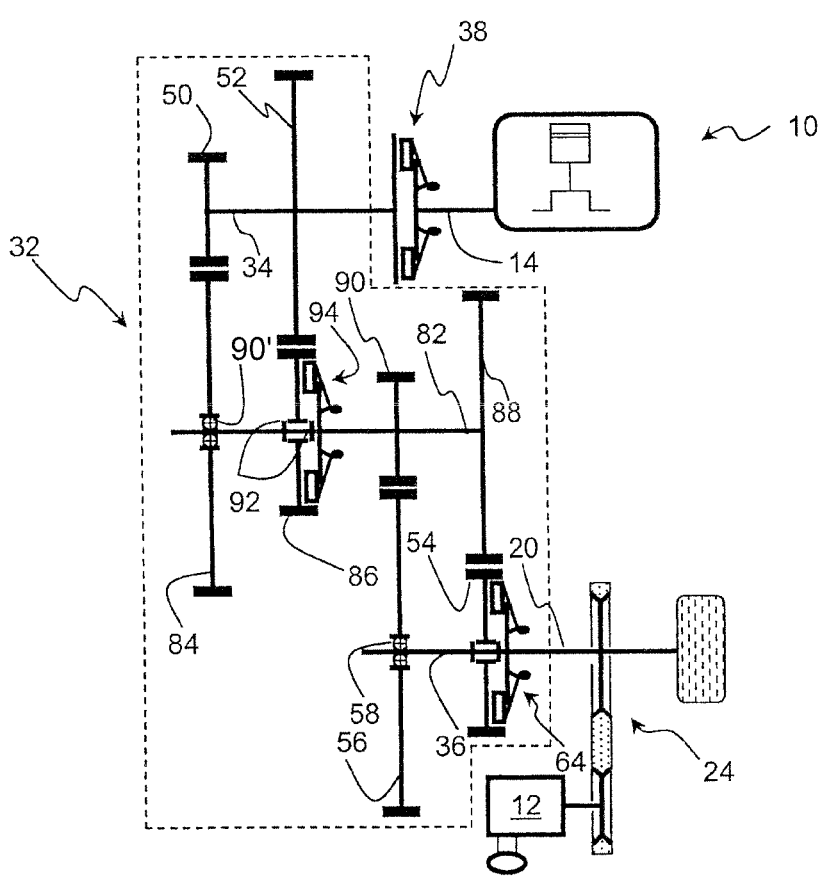
FIG. 4 is a diagram of another variant of the speed transmission device of FIGS. 1 and 2.

In the case of FIG. 4, which is a variant from FIGS. 1 and 2, an intercalated transmission shaft 82 is provided between primary shaft 34 and secondary shaft 36 while being parallel to these shafts so as to obtain a transmission with more than two ratios.

This intercalated shaft carries four intercalated toothed wheels, two toothed wheels 84 and 86 cooperating with toothed wheels 50 and 52 of the primary shaft with matching diameters and two toothed wheels 88 and 90 cooperating with toothed wheels 54 and 56 of secondary shaft 36, also with matching diameters.

Advantageously, large-diameter intercalated toothed wheel 84, which cooperates with primary small-diameter toothed wheel 50, is mounted on the intercalated shaft by interposing thereon a one-way coupling such as a free wheel 90'. Intercalated toothed wheel 86, of small diameter in relation to wheel 84, is mounted idle on intercalated shaft 82 and it is immobilized in axial translation on this shaft by fixed stops 92. As illustrated in FIG. 4, intercalated wheel 86 can be rotatingly secured to the intercalated shaft by means of a disengaging coupling 94 when the rotating speed of this shaft reaches a speed Ns. Preferably, this coupling 94 is a centrifugal clutch similar to clutch 64 arranged between secondary shaft 36 and secondary toothed wheel 56, and it therefore comprises the same elements.

The other two toothed wheels of this intercalated shaft are a large-diameter wheel 88 fastened to this shaft and a small-diameter wheel 90 also fixedly mounted to this shaft. These two wheels cooperate respectively with the secondary small diameter 54 and secondary large-diameter 56 wheels, as already described in connection with FIGS. 1 and 2.

For the operation of this device, a first gear ratio is established, after actuating coupling 38, through toothed wheels 50, 84, 90 and 56. This is achieved due to the fact that clutches 94 and 64 are not active and toothed wheels 86 and 54 are therefore inoperative.

From this first gear ratio, it is possible to obtain at least two additional gear ratios.

In cases where clutch 64 on secondary shaft 36 is first active, from a threshold speed Vs of this secondary shaft 36 generated by toothed wheels 50, 84, 90 and 56, the rotating speed of intercalated shaft 82 is decreased since toothed wheel 54 drives wheel 88 and, under the effect of the rotating speed differential between the intercalated shaft and the secondary shaft, toothed wheel 56 is disconnected from this secondary shaft. A second gear ratio passing through wheels 50, 84, 88 and 54 thus occurs.

Once clutch 64 is active, if the speed of the intercalated shaft continues to increase, the rotating speed of this intercalated shaft is going to reach a threshold value Rs from which clutch 94 is going to close. This action will have the effect of creating a disconnection of toothed wheels 84 and 56 under the effect of free wheels 92 and 58 due to the rotating speed differentials between intercalated shaft 82 and the primary 34 and secondary 36 shafts. A third gear ratio is thus established through toothed wheels 52, 86, 88 and 54.

The present invention is not limited to the embodiment example described and it encompasses any equivalent or variant covered by the invention.

Notably, it is possible to use controlled couplings instead of centrifugal clutches.

The invention claimed is:

1. A speed transmission configured to drive an axle which propels at least two wheels of the vehicle of a hybrid type motor vehicle comprising:
    a primary transmission shaft connected to a thermal engine through a disengaging coupling and which carries at least two primary toothed wheels cooperating with at least two secondary toothed wheels which are carried by a secondary transmission shaft connected to the axle shaft of the vehicle and to an electric machine to form two gear trains with different gear ratios for driving the vehicle at different gear ratios; and wherein
    one of the secondary toothed wheels is carried by the secondary transmission shaft through a free wheel one-way coupling, and another of the secondary toothed wheels is mounted idle in rotation on the secondary transmission shaft and is connected to the secondary transmission shaft through a centrifugal clutch disengaging coupling and operation of the free wheel coupling and the centrifugal clutch disengaging coupling provides selective connection and disconnection of the at least two primary toothed wheels and the at least two secondary toothed wheels to provide the different gear ratios for obtaining speed variation of the axle shaft to vary the speed of the vehicle; and wherein
    a first gear ratio is obtained between the thermal engine and the axle shaft through a first gear train including the free wheel coupling and a second gear ratio is obtained between the thermal engine and the axle shaft through a second gear train including the centrifugal clutch disengaging coupling.

2. A speed transmission for a hybrid type motor vehicle as claimed in claim 1, wherein the at least two primary toothed wheels and the at least two secondary toothed wheels form two gear trains with different gear ratios for obtaining the speed variation of the axle shaft.

3. A speed transmission for a hybrid type motor vehicle as claimed in claim 1, wherein the electric machine is connected to the axle shaft by a motion transmission multiplier track.

4. A speed transmission for a hybrid type motor vehicle as claimed in claim 2, wherein the electric machine is connected to the axle shaft by a motion transmission multiplier track.

5. A speed transmission for a hybrid type motor vehicle as claimed in claim 1, wherein the device comprises an intercalated shaft located between the primary transmission shaft and secondary transmission shaft and which carries intercalated tooth wheels cooperating with the wheels of the primary transmission shaft and the secondary transmission shaft.

6. A speed transmission for a hybrid type motor vehicle as claimed in claim 2, wherein the device comprises an intercalated shaft located between the primary transmission shaft and secondary transmission shaft and which carries intercalated tooth wheels cooperating with the wheels of the primary transmission shaft and the secondary transmission shaft.

7. A speed transmission for a hybrid type motor vehicle as claimed in claim 3, wherein the device comprises an intercalated shaft located between the primary transmission shaft and secondary transmission shaft and which carries intercalated tooth wheels cooperating with the wheels of the primary transmission shaft and the secondary transmission shaft.

8. A speed transmission for a hybrid type motor vehicle as claimed in claim 4, wherein the device comprises an intercalated shaft located between the primary transmission shaft and secondary transmission shaft and which carries intercalated tooth wheels cooperating with the wheels of the primary transmission shaft and the secondary transmission shaft.

9. A speed transmission for a hybrid type motor vehicle as claimed in claim 5, wherein one of the intercalated toothed wheels cooperates with one of the toothed wheels of the primary transmission shaft and is carried by the intercalated shaft through a one-way coupling.

10. A speed transmission for a hybrid type motor vehicle as claimed in claim 6, wherein one of the intercalated toothed wheels cooperates with one of the toothed wheels of the primary transmission shaft and is carried by the intercalated shaft through a one-way coupling.

11. A speed transmission for a hybrid type motor vehicle as claimed in claim 7, wherein one of the intercalated toothed wheels cooperates with one of the toothed wheels of the primary transmission shaft and is carried by the intercalated shaft through a one-way coupling.

12. A speed transmission for a hybrid type motor vehicle as claimed in claim 8, wherein one of the intercalated toothed wheels cooperates with one of the toothed wheels of the primary transmission shaft and is carried by the intercalated shaft through a one-way coupling.

13. A speed transmission for a hybrid type motor vehicle as claimed in claim 9, wherein another of the intercalated toothed wheels cooperates with another toothed wheel of the primary transmission shaft and is freely carried on the intercalated shaft while being connected to primary transmission shaft through a disengaging coupling.

14. A speed transmission for a hybrid type motor vehicle as claimed in claim 10, wherein another of the intercalated toothed wheels cooperates with another toothed wheel of the primary transmission shaft and is freely carried on the intercalated shaft while being connected to primary transmission shaft through a disengaging coupling.

15. A speed transmission for a hybrid type motor vehicle as claimed in claim 11, wherein another of the intercalated toothed wheels cooperates with another toothed wheel of the primary transmission shaft and is freely carried on the intercalated shaft while being connected to primary transmission shaft through a disengaging coupling.

16. A speed transmission for a hybrid type motor vehicle as claimed in claim 12, wherein another of the intercalated toothed wheels cooperates with another toothed wheel of the primary transmission shaft and is freely carried on the intercalated shaft while being connected to primary transmission shaft through a disengaging coupling.

\* \* \* \* \*